US009423151B2

(12) United States Patent
Kacar et al.

(10) Patent No.: US 9,423,151 B2
(45) Date of Patent: Aug. 23, 2016

(54) ELECTRIC HEATING SYSTEM, A CONTROL HEAD AND A HEATING LIQUID

(71) Applicant: Aurora3M + d.o.o., Ljubljana (SI)

(72) Inventors: Sukrija Kacar, Mala Nedelja (SI); Marko Adzaga, Ljubljana (SI); Franc Zeljko Zupanic, Ljubljana (SI)

(73) Assignee: Aurora3M+ d.o.o., Ljubljana (SI)

( * ) Notice: Subject to any disclaimer, the term of this patent is extended or adjusted under 35 U.S.C. 154(b) by 215 days.

(21) Appl. No.: 14/351,572

(22) PCT Filed: Oct. 12, 2012

(86) PCT No.: PCT/EP2012/004282
§ 371 (c)(1),
(2) Date: Apr. 13, 2014

(87) PCT Pub. No.: WO2013/053493
PCT Pub. Date: Apr. 18, 2013

(65) Prior Publication Data

US 2014/0321836 A1 Oct. 30, 2014

Related U.S. Application Data

(60) Provisional application No. 61/547,163, filed on Oct. 14, 2011.

(30) Foreign Application Priority Data

Oct. 14, 2011 (EP) .................................... 11008313

(51) Int. Cl.
*H05B 3/60* (2006.01)
*A47J 31/00* (2006.01)
(Continued)

(52) U.S. Cl.
CPC .............. *F24H 1/106* (2013.01); *F24H 9/0047* (2013.01); *F24H 9/2028* (2013.01); *H05B 3/60* (2013.01)

(58) Field of Classification Search
None
See application file for complete search history.

(56) References Cited

U.S. PATENT DOCUMENTS 2,619,579 A * 11/1952 Cartinhour ............ F24H 3/0405 392/478
2,790,889 A * 4/1957 Hynes ..................... F24H 1/102 219/539

(Continued)

FOREIGN PATENT DOCUMENTS

| | | | |
|---|---|---|---|
| CA | 2613910 | | 6/2009 |
| WO | WO 2011 082442 | A2 | 7/2011 |
| WO | WO 2011 082452 | A1 | 7/2011 |

*Primary Examiner* — Thor Campbell
(74) *Attorney, Agent, or Firm* — Saliwanchik, Lloyd & Eisenschenk

(57) ABSTRACT

A heating system to heat a main heating circulation comprises an electric heater, a control head, a heat exchanger, a pump, and a plurality of tubes. The electric heater is adapted to heat a primary heating liquid by applying an electric current directly to the primary heating liquid. The control head is adapted to determine a temperature and a pressure of the primary heating liquid. The heat exchanger comprises a first liquid passage for the primary heating liquid and a second liquid passage for a secondary heating liquid in the main heating circulation. The second liquid passage is in thermal contact with the first liquid passage to heat the secondary heating liquid while cooling the primary heating liquid. The tubes connect the electric heater, the control bead, the heat exchanger and the pump to define a circulation for the primary heating liquid. The pump is adapted to pump the primary heating liquid such that heat is transferred from the heater via the heat exchanger into said the heating circulation.

20 Claims, 11 Drawing Sheets

(51) Int. Cl.

| | |
|---|---|
| ***F24H 1/10*** | (2006.01) |
| ***F24H 9/20*** | (2006.01) |
| ***F24H 9/00*** | (2006.01) |

(56) References Cited

U.S. PATENT DOCUMENTS

| | | | | | |
|---|---|---|---|---|---|
| 3,541,304 | A * | 11/1970 | Cohn | F24H 1/121 | 392/485 |
| 3,576,968 | A * | 5/1971 | Collie | F24H 1/106 | 126/101 |
| 3,666,917 | A * | 5/1972 | Oglesby | F24H 1/106 | 392/311 |
| 3,855,449 | A * | 12/1974 | Schneider | F24H 1/225 | 165/104.21 |
| 4,233,494 | A * | 11/1980 | Pawlik | F24H 1/103 | 219/536 |
| 4,406,806 | A * | 9/1983 | Despault | C09K 5/063 | 126/400 |
| 4,953,536 | A * | 9/1990 | Israelsohn | F24H 1/106 | 237/2 R |
| 5,134,684 | A * | 7/1992 | Mishou | H05B 3/44 | 392/379 |
| 5,440,667 | A * | 8/1995 | Simpson | F24H 1/106 | 219/509 |
| 6,080,973 | A * | 6/2000 | Thweatt, Jr. | F24H 9/0047 | 219/497 |
| 7,050,706 | B2 * | 5/2006 | Israelsohn | F24H 1/106 | 392/314 |
| 7,085,483 | B2 * | 8/2006 | Terashima | F28D 20/003 | 165/10 |
| 7,190,886 | B2 * | 3/2007 | Dubicki | F24H 1/106 | 392/311 |
| 7,403,701 | B2 * | 7/2008 | Choi | F22B 1/306 | 392/311 |
| 7,565,065 | B2 * | 7/2009 | Kato | F24H 1/142 | 392/311 |
| 7,817,906 | B2 * | 10/2010 | Callahan | F24H 1/106 | 392/311 |
| 8,565,588 | B2 * | 10/2013 | Bierbaumer | F24H 1/106 | 392/311 |
| 8,663,573 | B2 * | 3/2014 | Murakami | B01J 19/006 | 422/129 |
| 9,175,865 | B2 * | 11/2015 | Kristjansson | F24D 11/0221 | |

* cited by examiner

ELECTRIC HEATING SYSTEM, A CONTROL HEAD AND A HEATING LIQUID

CROSS REFERENCE TO A RELATED APPLICATION

This application is a National Stage Application of International Application Number PCT/EP2012/004282, filed Oct. 12, 2012; which claims priority to European Application No. 11 008 313.6, filed Oct. 14, 2011; and claims the benefit of U.S. Provisional Application Ser. No. 61/547,163, filed Oct. 14, 2011; all of which are incorporated herein by reference in their entirety.

The present invention relates to an electric heating system, a control head and a liquid to be used in an electric heating system and, in particular, to an electric heating system, wherein electric energy is converted into thermal energy by directing an electric current through the heating liquid, thereby heating the heating liquid.

BACKGROUND OF THE INVENTION

Electric energy is considered to be a clean energy, which does not produce any pollution when consuming the electric energy. In addition, electric energy can easily be managed and controlled to meet particular demands and, moreover, is widely available. Therefore, the use of electric energy also for heating purposes gains increased importance.

Conventional heating systems rely mostly on chemical energy stored, e.g., in oil, gas or coal which cause a significant amount of pollution when producing heat by burning these fossil recourses to heat, for example, water for buildings. The corresponding emissions lower the air quality, in particular, in densely populated areas and, in addition, transport still a significant amount of heat in the environment, because chemical energy can not be used to 100% for the desired purpose.

Also conventional electric heaters are disadvantageous in that they rely on electric current applied to heat wires, thereby heating the wires and subsequently the water or air surrounding the heat wires. However, conventional electric heaters need always some isolation, thereby slowing down the heating process. In addition, the heat wires are subject to significant wear and tear and thus become less efficient with time.

Therefore, there is a need for providing heating systems, which work efficiently, provide thermal energy in short time, and are easy to manage and to control while working at zero emission.

SUMMARY OF THE INVENTION

The aforesaid problems are solved by an electric heating system according to claim 1, a control head according to claim 14 and a heating liquid according to claim 15. Claims 2-13 refer to specifically advantageous realizations of the subject matter of claim 1.

The present invention solves the aforesaid problems in that a heating system to heat a main heating circulation comprises an electric heater, a control head, a heat exchanger, a pump, and a plurality of tubes. The electric heater is adapted to heat a primary heating liquid by applying an electric current directly to the primary heating liquid. The control head is adapted to determine a temperature and a pressure of the primary heating liquid. The heat exchanger comprises a first liquid passage for the primary heating liquid and a second liquid passage for a secondary heating liquid in the main heating circulation. The second liquid passage is in thermal contact with the first liquid passage to heat the secondary heating liquid while cooling the primary heating liquid. The tubes connect the electric heater, the control head, the heat exchanger and the pump to define a circulation for the primary heating liquid. The pump is adapted to pump the primary heating liquid such that heat is transferred from the heater via the heat exchanger into the main heating circulation (secondary circulation system).

In further embodiments, the heat exchanger provides a galvanic separation of the primary circulation systems from the secondary circulation system. For example, dielectric materials may be arranged between the primary liquid and the secondary liquid so that no electric current can flow between the primary liquid and the secondary liquid. The blocked electric current can either relate to a DC current (no transport of charge carriers between both heating liquids), but may also refer to an AC current (for example, in that the complex impedance of the heat exchanger is infinite). The galvanic separation provides thus an improved safety.

In further embodiments the safety is further improved in that the heat exchanger and the plurality of tubes (or system of tubes) are configured to prevent a user from getting into electric contact with the primary liquid. For this reason, also the tubes may, for example, comprise dielectric materials. In addition, the tubes may comprise optional metal fittings at the respective ends of the tubes and the metallic fittings can be grounded such that the primary liquid is in electric contact to a ground potential (e.g. zero potential). As consequence, a liquid flowing through the different components is in electric contact with the ground potential so that if the primarily liquid still contains some net electric charges (i.e. it is charged relative to the ground potential), these net charges will be transferred to the ground potential and can not cause any harm for a user which touches one of these components.

Further embodiments relate to a heating system, wherein said electric heater is connectable to a power supply comprising at least two power lines and said primary heating liquid flows through said electric heater along a flow path. The electric heater further comprises a central electrode connected to a central electrode terminal and a cylindrical outer electrode connected to an outer electrode terminal. The central electrode and the cylindrical outer electrode are separated by the flow path in a coaxial arrangement such that an electric current flows between the central electrode and the cylindrical outer electrode when the at least two power lines are connected to the central electrode terminal and to the outer electrode terminal. An advantage of such coaxial arrangements is that they do not need much space and are easy to manufacture. In addition, dependent on the particular demand they can be combined. For example, three of them can be arranged in parallel and connected to different phases of a power supply.

In further embodiments, the electric heater comprises a liquid inlet and a liquid outlet for the primary liquid, and, in addition, may comprise ground electrodes being arranged at the liquid inlet and/or at the liquid outlet. The ground electrodes may be arranged perpendicular to the liquid flow such that the liquid passes the ground electrodes (e.g., in that they comprise different openings for the flow of the primary liquid). As result the primary liquid outside the electric heater is on the ground potential. In further embodiments, the electric heater comprises an electrode assembly with a plurality of electrodes, which are arranged such that each of the electrodes is connected to the power source and the electrodes are formed such that the area, which is exposed to the primary liquid, is equal for the different electric power lines. For example, the electric power source can be a three-phase power supply so that, for example, five terminals are available, three of them for the three different phases of the power line, a further terminal for the neutral or null signal and a ground or earth terminal (which shall comprise a lower impedance than the neutral terminal). The ground terminal can be connected to one of the ground electrodes provided at the fluid inlet and fluid outlet, whereas the three phase electrodes are connected to the electrode assembly such that two adjacent electrodes are connected to different lines of the three-phase supply and the primary liquid flows between these adjacent electrodes. As a result, the electric current generated in the primary fluid is homogeneous throughout the electric heater, thereby providing an efficient mechanism for transforming the electric energy into heat energy.

In further embodiments, the control head comprises a working thermostat sensor and a safety thermostat sensor, wherein the working thermostat sensor is used to determine the temperature of the primary liquid. The safety thermostat sensor provides, for example, a signal when a temperature threshold signal is reached, thereby providing a security measure such that a maximum temperature can be set and monitored. For example, when the maximum threshold temperature is exceeded, the heating is automatically interrupted, e.g. in that the electric current through the primary liquid is interrupted. The working thermostat sensor may, e.g., be used to define two limits, an upper limit and a lower limit so that when the temperature reaches the lower limit, the heating starts and when the temperature of the primary liquid reaches the upper limit, the heating is interrupted. This defines a working range of the heating system.

Further embodiments comprise an optional control unit, which is configured to obtain the temperature and pressure from the control head and, based on the measured quantities, to operate the electric heater accordingly. For example, the control unit may be configured to use the measured temperature and pressure to control the electric heater in that the value of the current applied to the electric heater is modified. In addition, the electric current may be applied as pulses to the primary liquid (pulsed mode) and the control unit may be configured to modify a frequency of the pulses such that the temperature and/or the pressure is adjusted to be within acceptable operational limits. Optionally, the control unit and/or the control head may comprise a display for a user to show the current temperature and pressure and to show the operational limits. For example, an optional thermal-manometer may be arranged at the control head to display the current temperature and pressure in the heating system, which can thus be monitored by the user.

Optionally, the control head comprises an air vent which is configured to release air from the plurality of tubes to optimize the circulation of the primary heating liquid. In further embodiments the heating system comprises an expansion unit which is adapted to provide a constant (predetermined) pressure of said primary heating liquid in that a varying volume is provided for the primary heating liquid. Therefore, volume modifications due to heating and cooling of the system are compensated. The expansion unit may, e.g., comprise a bellow or similar devices which are able to expand the volume in case the pressure increases and shrink the volume when the pressure decreases.

In further embodiments the control head comprises access ports providing contact to the primary heating liquid and being configured to couple one or more devices selected from the group consisting of: the working thermostat sensor, the safety thermostat sensor, the pressure sensor, the expansion unit, and the air vent. Therefore, the control head may comprise seven inlets and/or outlets so that, in addition to the access ports a heating liquid inlet, which may be connected to the electric heater (via a tube or directly), and an outlet is provided. The control head may be provided as integral component.

The control unit can be configured to control the electric heater to operate in the pulsed mode, because the liquid is heated very quickly. In the pulsed mode no continuous electric current is applied to the primary liquid, but pulsed electric signals in an operational frequency are applied to the primary liquid. By changing the operational frequency of the pulsed signals, the temperature of the primary liquid can be controlled to be in predetermined ranges. In addition, the pulsed operational mode may ensure that no electrolytic gas is generated at the different electrodes (as e.g. hydrogen), because any generated gas ions can recombine in the periods between the pulses. In addition, the control unit may be configured to apply an alternating current to the electrodes of the electric heater so that also the frequency of the applied alternating current may ensure that no electrolytic gases can be generated by the current flowing through the primary liquid. Thus, the use of alternating current also suppresses the aggregation of gas at particular electrodes. The pulsed mode can, e.g., be set up in that the power of the power supply is periodically supplied to the primary liquid so that the current flowing through the primary liquid will sharply increase and drop rapidly after the power is disconnected from the electrodes.

In further embodiments the primary heating liquid may be any kind of fluid (or medium) suitable to generate thermal energy when electric current is applied thereto and which is suitable to transport the generated thermal energy to the heat exchanger.

Further embodiments relate to a specific liquid as primary heating liquid for use in a heating system as described before. For example, the primary liquid may comprise compounds such that the electric conductivity (or electric resistance) is within a predetermined range of 40-380 μS (micro Siemens).

This can, e.g., be achieved in that the following mixture of materials: 1. Distilled water (30-80%), 2. Sodium tetraborate (Borax—$Na_2B_4O_7 \times 10H_2O$—0.40-0.10%), 3. Propylene glycol ($C_3H_8O_2$ or HO—$CH_2$—CHOH—$CH_3$—20-65%), 4. Waterglass (sodium or potassium silicate—$Na_2SiO_3$—0.002-0.025%), 5. Ammonium molybdate ($(NH_4)_2MoO_4$—0.01-0.15%) and 6. Acetic acid ($CH_3COOH$—1-3%). The ratio of the various components of the heating liquid is important to obtain a desired output power of the heating device (here and in the following all %-values may refer to volume-%).

In further embodiments the secondary liquid may be a mixture of (distilled) water, alcohol and/or glycol (e.g. 50% distilled water and 50% alcohol), or any other liquid.

Embodiments of the invention relate also to a control head for use in a heating system as described before. The control head comprises a plurality of access ports providing contact to the primary heating liquid and being configured: to couple to the working thermostat sensor for providing the temperature of the primary heating liquid, to couple to the safety thermostat sensor to provide a temperature threshold signal, to couple to said pressure sensor for providing the pressure of the primary heating liquid, and to couple to the expansion unit for compensating a volume expansion of the primary heating liquid. The control head is integrally formed.

Embodiments of the present invention have a number of advantages over the prior art. For example, by using an electric heater which applies electric current directly to water the water heats up very quickly. As consequence, a pulsed mode can be used to heat the water directly, which in turn can easily be controlled. This efficient operation mode is not possible in conventional systems, because of the heating delay of those systems. In addition, the control head can combine all needed monitoring devices (manometer, thermostat, thermometer, etc.) within a single piece, which can be connected directly or close to the electric heater. If, for example, the electric heater is in downstream direction from the control head, the temperature and pressure of the heated water can be monitored directly and immediately after the heater without much time delay.

Moreover, compared to conventional heating systems, which use, e.g., gas or oil and need a burning chamber, the heating system according to the present invention is very small. It is very simple in operation and, because a liquid is heated directly by the electric current, there is practically no possibility of damages or heater burning out. Due to the direct heating of the primary liquid, the heating is also very efficient and inexpensive. In case of any leakage of fluid, the heating system will stop immediately (because the pressure and/or temperature will exceed the operation limits) which prevents damages or even fire. The room temperature may, e.g., be automatically regulated by thermostats, which may control the heating system and turn it on and off as soon as the temperature has reached a predetermined limit.

Thus, the heating system provides a high measure of security and a high degree of protection, because the heat system would immediately cease to work upon depletion of water even without using the thermostat, auto fuse or an auto clutch.

The secondary circulation system provides the possibility to distribute the heated water also over different floors. Unlike other heating systems based on boilers burning fossil recourses, the electric heating system according to the present invention does not create any source of toxic fumes, ashes or any other hazardous materials for the health of the users and the environment. Finally, the heating system is completely silent at work.

BRIEF DESCRIPTION OF THE DRAWINGS

The features and numerous advantages of the invention will be described hereafter in further detail with reference to the accompanying drawings, in which.

DETAILED DESCRIPTION

Figure 1:
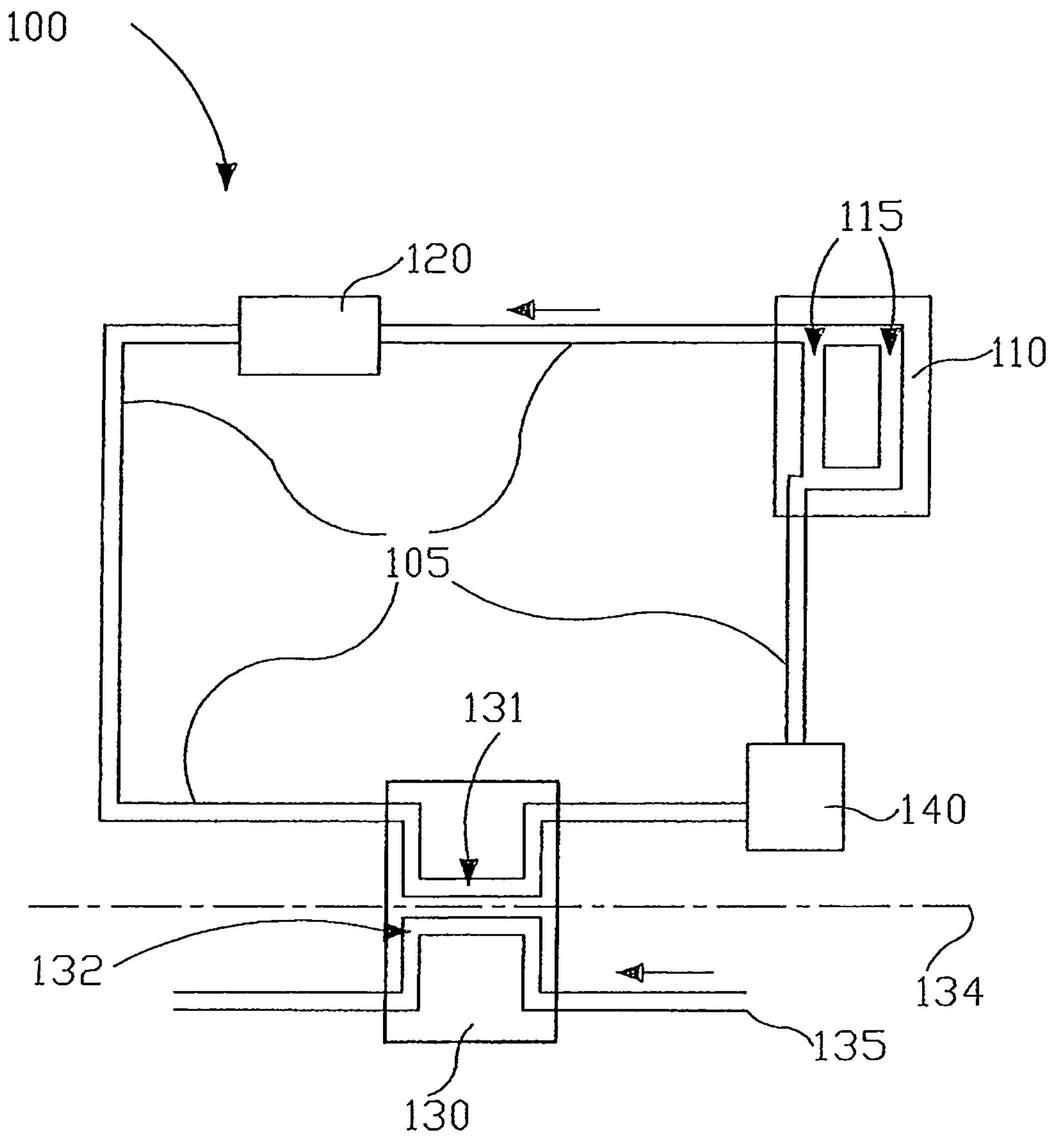
FIG. 1 illustrates the heating system according to an embodiment of the present invention.

FIG. 1 shows a heating system 100 comprising an electric heater 110, a control head 120, a heat exchanger 130, a pump 140 and a plurality of tubes 105 connecting the electric heater 110, the control head 120, the heat exchanger 130 and the pump 140. The electric heater is adapted to heat a primary (heating) liquid flowing through the tubes 105 by applying an electric current directly to the primary liquid. For example, the electric current (or electric voltage) may be applied on the primary heating liquid along a fluid passage 115 inside the electric heater 110. The control head 120 is adapted to determine the operational parameter, as, e.g., a temperature and a pressure of the primary liquid. Optionally, the control head 120 may be configured to control that the operational parameters are in operational limits (e.g. to lower the pressure when an upper limit is exceeded). The heat exchanger 130 comprises a first liquid passage 131 for the primary heating liquid and a second liquid passage 132 for a secondary heating liquid in a main heating circulation, wherein the second liquid passage 132 is in thermal contact with the first liquid passage 131 to heat the secondary heating liquid while cooling the primary heating liquid. The pump 140 is adapted to pump the primary liquid through the system of tubes 105 within the primary circulation system (circulation for the primary liquid).

Figure 2:
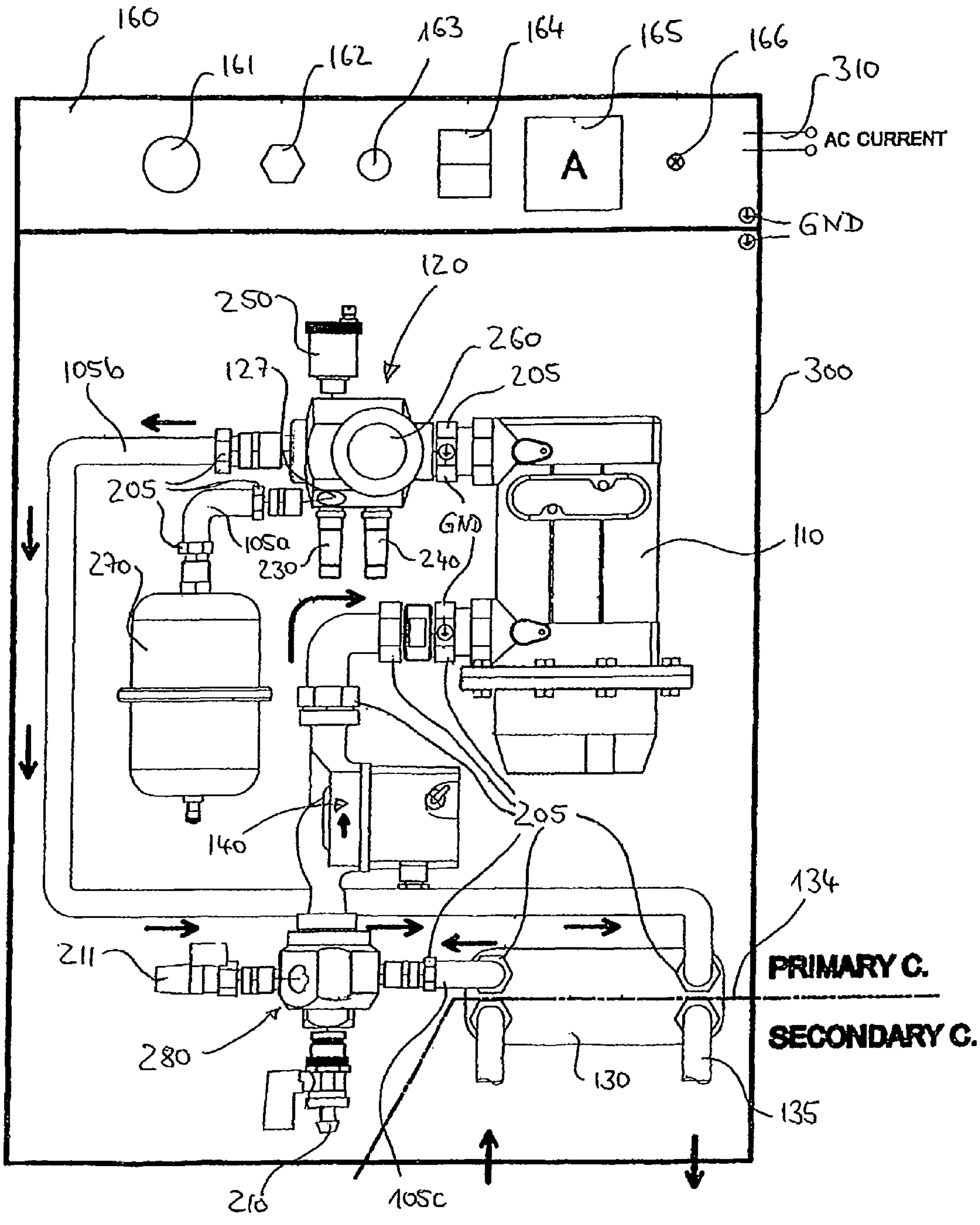
FIG. 2 illustrates the different components of the heating system.

FIG. 2 shows in detail a preferred embodiment with different components of the heating system 100. On top of the heating system 100 an optional control unit or control panel 160 is arranged and below the control panel 160 the heating system as shown in FIG. 1 is accommodated within a case or housing 300.

The electric heater 110 is connected with the control head 120, either directly or via one of the plurality of tubes 105. The control head 120 comprises a working thermostat sensor 230, a safety thermostat sensor 240, an air vent 250 and a connection 127 for an expansion unit 270, which is connected to the control head 120 (directly or) via a first tube 105*a*. The control head 120 comprises, moreover, a thermo-manometer 260, which is adapted to show the temperature and/or the pressure of the primary liquid flowing in the system of tubes 105 (as indicated by the arrows). The control head 120 is connected with the heat exchanger 130 with a second tube 105*b*.

Between the heat exchanger 130 and the pump 140 an optional connector 280 is arranged. The optional connector 280 comprises a further inlet 210 for the primary liquid (to fill the primary liquid in the tubes, e.g., via filling valve). In addition, the connector 280 comprises a pressure safety valve 211, which is configured to open in case the pressure within the system of tubes 105 exceeds a safety threshold, to thereby prevent damages of the heating system. The heat exchanger 130 is connected with the optional connector 280 via a third tube 105*c*.

The pump 140 may, e.g., be connected directly to the optional connector 280 (or via a further tube) and is configured to pump the primary liquid circulating within the system of tubes 105 such that the primary liquid flows from the pump 140 towards the electric heater 110. Therefore, the pump 140 may be arranged upstream from the electric heater 110, wherein the pump 140 may be directly connected to the electric heater 110 or may be connected via a fourth tube 105*d*.

The system of tubes 105 can optionally be grounded by a plurality of fittings 205, which are arranged at some or each end of the tubes 105. The tubes 105 may, e.g., be formed by an insulating (electrically and/or thermally) material and the optional fittings 205 at the ends of the tubes 105 may comprise electrically conducting material (e.g. metal) such that the primary liquid is in electric contact with the electrical conducting fittings 205. By connecting the fittings 205 or some of the fittings 205 to a ground potential GND, the primary liquid can be discharged so that the flow of the primary liquid does not cause an electric flow via the system of tubes 105.

The heat exchanger 130 is configured to provide a heat flow from the primary liquid to a secondary liquid in the tubes of the main (secondary) circulation system 135. Preferably, the heat exchanger 130 comprises dielectric material such that no electric connection is provided between the primary liquid and the secondary liquid. In addition, the heat exchanger 130 may preferably comprise a material with high thermal conductivity such that an efficient heat transport between the primary liquid and the secondary liquid can be achieved. Optionally, the heat exchanger 130 may also be electrically connected to the ground potential GND. The heat exchanger 130 (FIG. 2) may also be made of metal materials and may be electrically conductive. However, the material of the tubes 135 (FIG. 2) should be made of dielectric material such as plastic or alike.

For security, a galvanic separation as indicated by the line 134 between the primary circulation system and the secondary circulation system is therefore be provided so that no electric current can leave the heating system via the tubes of the main circulation system 135.

The monitoring and controlling of the system as shown in FIG. 2 may be provided by the control panel 160, which can, e.g., be arranged on top of the heating system within the same housing 300. The control panel 160 may, e.g., comprise a working thermostat 161 and a safety thermostat 162, which are configured to adjust or show the temperature as set for the safety (e.g., 95° C.) and to define a working range (as e.g. within 50-70° C. or 30-90° C.). These temperatures depend on the particular composition of the primary heating liquid and may, for example, be at least 5% below the boiling temperature of the primary liquid.

The temperature and pressure is measured and displayed on the pressure sensor 260 (FIG. 2). The working sensor 230 (FIG. 2) on the control head 120 (FIG. 2) is connected to the working thermostat 161 (FIG. 2) on the control unit 160 (FIG. 2); the safety sensor 240 (FIG. 2) is connected to the safety thermostat 162 (FIG. 2) on the control unit (FIG. 2, 160).

The control panel 160 may, moreover, comprise one or more fuses 163 which may interrupt the operation in case the applied current to the primary liquid exceeds a predetermined upper threshold (e.g. 30 A or of 40 A) and/or in case the pressure or temperature within the system exceeds further thresholds to prevent damages. In addition, the control panel 160 may comprise a switch 164 to turn on/off the system, an Ampere-meter 165 to show the value of the electric current applied to the primary liquid. Finally, the control panel 160 may optionally comprise an LED light indicator 166 to show that the system is currently working or is turned off. The fuse 163 (FIG. 2) may be of 1.6 A and may protect the control panel only. The fuse of the building in which the heating device is installed might be of 30 A so that the heating system should not exceed 20-25 A.

The control panel 160 may together with the heating system be grounded by connecting the housing 300 to the ground potential GND. The heating system 100 is connectable to an AC current supply 310 as, e.g., the usual 220 V power supply or a 3×380 V (three phase) power supply.

Figure 3A:
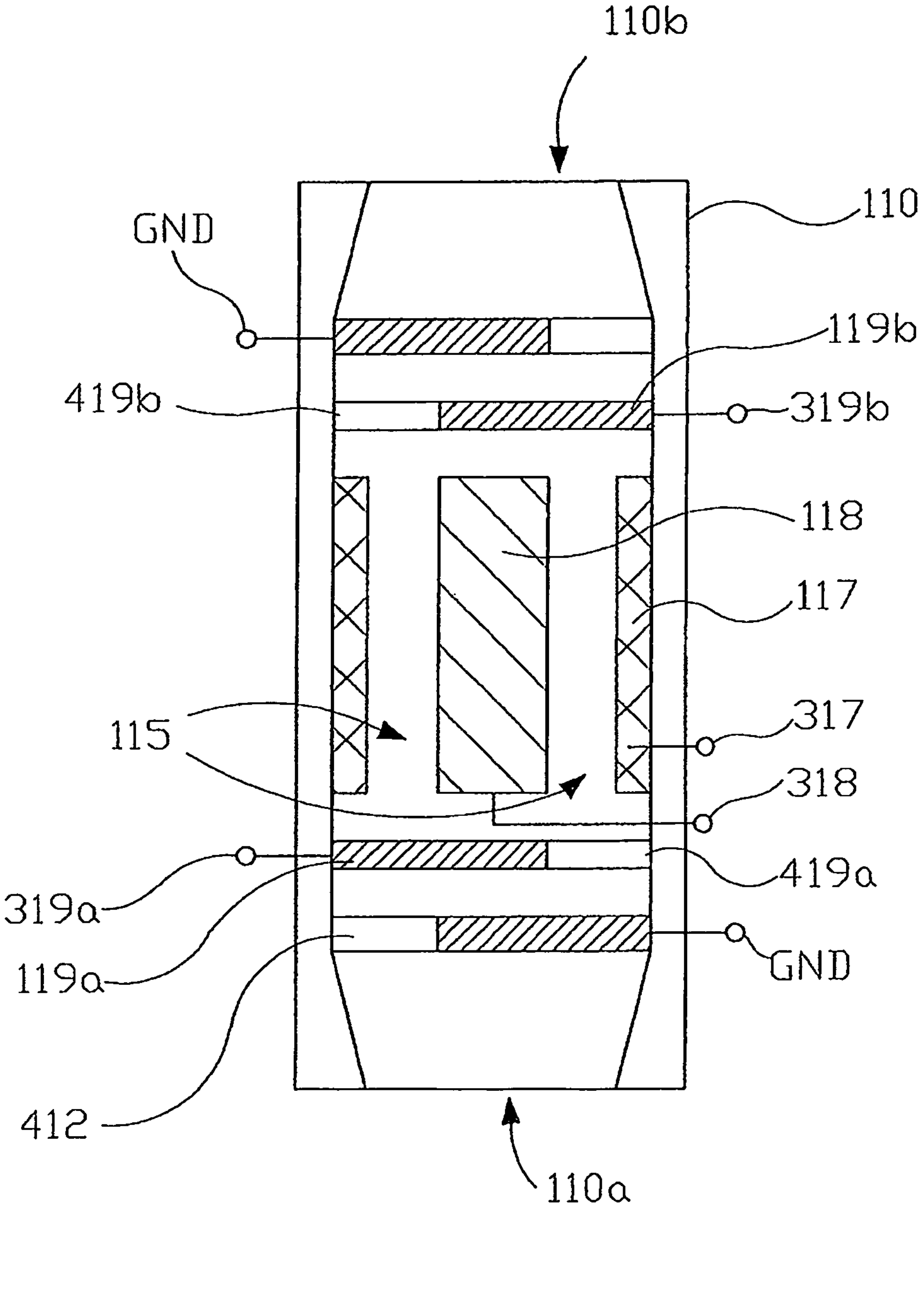
FIG. 3 depicts different electrode assemblies and its connection within the electric heater.
Figure 3B:
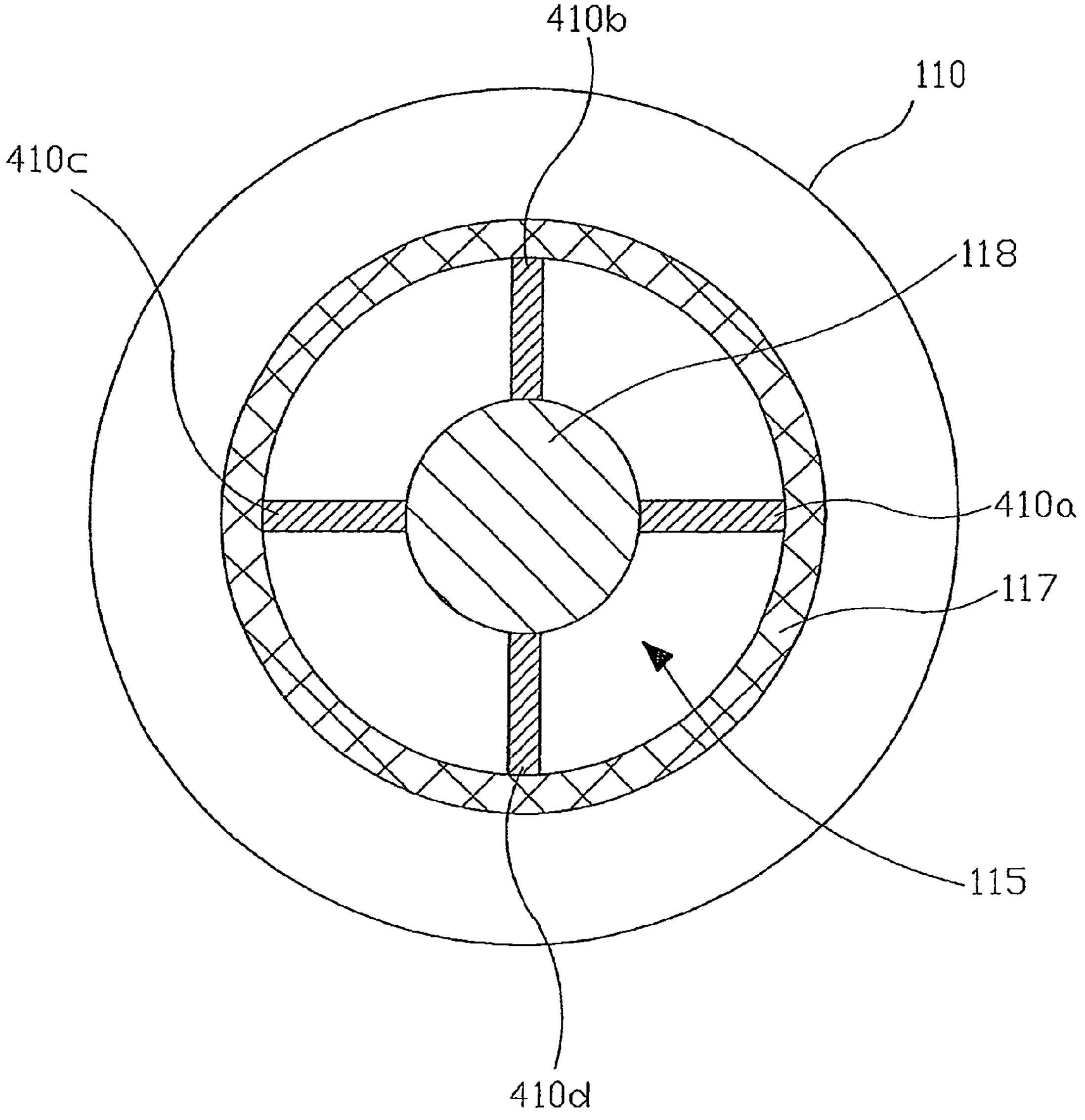
Figure 3C:
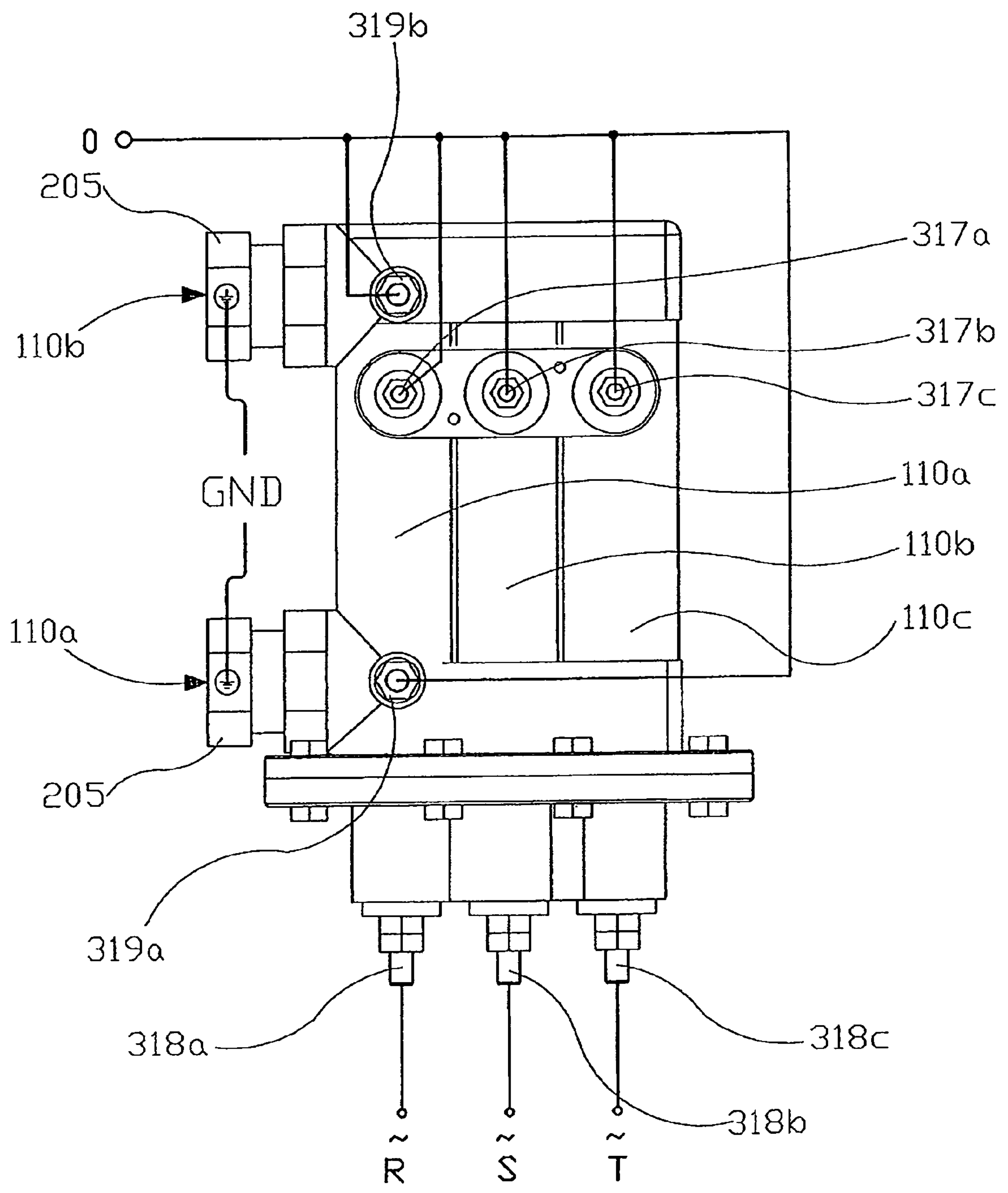

FIG. 3A-B depict different electrode assemblies for the heater 110 and FIGS. 3C,D depict a possible connection of the electrodes to the power supply.

FIG. 3A shows a first embodiment for the heating cell inside the electric heater 110 with a plurality of electrodes arranged inside the heating cell along the fluid passage 115. This embodiment uses a coaxial electrode arrangement with a central electrode 118 connected to a terminal 318 and an outer electrode 117 connected to a terminal 317, which are arranged in a cylindrical configuration between a liquid inlet 110*a* and a liquid outlet 110*b* of the electric heater 110. In addition, at the liquid inlet 110*a* a ground electrode connected to the ground potential GND is provided with an opening 412 to provide a passage for the primary liquid. Downstream of the ground electrode (with respect to the primary liquid) a neutral electrode 119*a* connected to a terminal 319*a* is provided, which is again arranged perpendicular to the flow path of the primary liquid and which also comprises an opening 419*a* for the primary liquid to pass after entering the heating cell from the liquid inlet 110*a*. After passing the opening 419*a* the primary liquid enters the fluid passage 115 which is arranged between the central electrode 118 and the cylindrical outer electrode 117. After leaving the fluid passage 115 the primary liquid passes a further opening 419*b* of a further neutral electrode 119*b* before the primary liquid passes the opening of a further ground electrode provided at the liquid outlet 110*b* of the electric heating cell 110. The further neutral electrode 119*b* is connected to a terminal 319*b* and the ground electrode is connected to the ground potential. Therefore, each of the electrodes 117, 118, 119 and the ground electrode are provided with separate terminal 317, 318, 319 to be contacted with a power supply, which may, for example, either be a three-phase, a two-phase or a mono-phase power signal.

FIG. 3B shows a cross-sectional view of the embodiment of FIG. 3A perpendicular to the fluid passage 115 crossing the central electrode 118 and the cylindrical outer electrode 117. In this embodiment the electric heater 110 (or more particular, the electric heating cell) comprises a circular shape as shown in FIG. 3B, wherein a cylindrical outer electrode 117 is arranged around the central electrode 118 in a coaxial shape. The central electrode 118 is supported, e.g., by four support elements 410*a*, 410*b*, 410*c* and 410*d*.

To initiate an electric current between the central electrode 118 and the outer circular electrode 117 an electric voltage is applied, for example, by connecting both electrodes to different phases of the provided power supply. If, e.g., a three-phase power supply is used a first phase of the three phases can be connected to the outer cylindrical electrode 117 and a second phase of the three phases can be connected to the central electrode 118. The third of the three phases may in this configuration not be used. The electrode 119 at the liquid inlet 110*a* and/or at the liquid outlet 110*b* may be connected to the neutral (null) potential of the three-phase power supply or may optionally be connected to third phase of the 3-phase power supply. Finally, the ground electrode is connectable to the ground potential GND. For these connections the terminals 317, 318 and 319 can be used, wherein these terminals can be arranged at different positions of the heating cell.

The support elements 410 comprise, e.g., a dielectric material which can withstand the temperature of the electric heater 110. Alternatively, the support elements 410 can also be used for the electric connection to the central electrode 118, in which case, the support elements 410 are provided along the axial direction such that they do not contact the outer cylindrical electrode 117.

FIG. 3C shows an embodiment for the connection of the electric heater 110, which comprises three heating cells 110*a*, 110*b*, 110*c* arranged in parallel along the flow path of the primary heating liquid. The liquid inlet 110*a* and the liquid outlet 110*b* are provided with fittings 205, which are both connected to the ground potential GND. The terminals 317, 318, 319 of the electrodes 117, 118, 119 are connected either to the neutral potential (O) or to one of the three phases R, S, T of a three-phase power supply for the electric heater 110.

In the embodiment as shown in FIG. 3C each of the heating cells 110*a*, 110*b*, 110*c* comprises a central electrode 118*a,b,c* and a cylindrical electrode 117*a,b,c* so that in a first cell 110*a* a central electrode 118*a* is connected via the terminal 318*a* to the R-phase of the power supply and the cylindrical electrode 117*a* is connected via the terminal 317*a* to the neutral potential O. The second heating cell 110*b* has a central electrode 118*b* connected via the terminal 318*b* to the S-phase of the power supply and a cylindrical electrode 117*b* connected via a terminal 317*b* to the neutral terminal O. The third heating cell 110*c* has also a central electrode 118*c* connected via a terminal 318*c* to the T-phase of the power supply and the cylindrical 117*c* is connected via a terminal 317*c* to the neutral terminal O.

In addition, at the fluid inlet 110*a* a neutral electrode 119*a* is provided, which is downstream from the fitting 205 and is also connected via a terminal 319*a* to the neutral terminal O. Similarly, at the fluid outlet 110*b*, a further neutral electrode 119*b* is provided which is upstream from the further fitting 205*b* and which is also connected via the further terminal 319*b* to the neutral terminal O. Therefore, the connection as shown in FIG. 3C comprises three heating cells as shown in FIGS. 3A, B, which are electrically connected to different phases of the power supply.

Figure 3D:
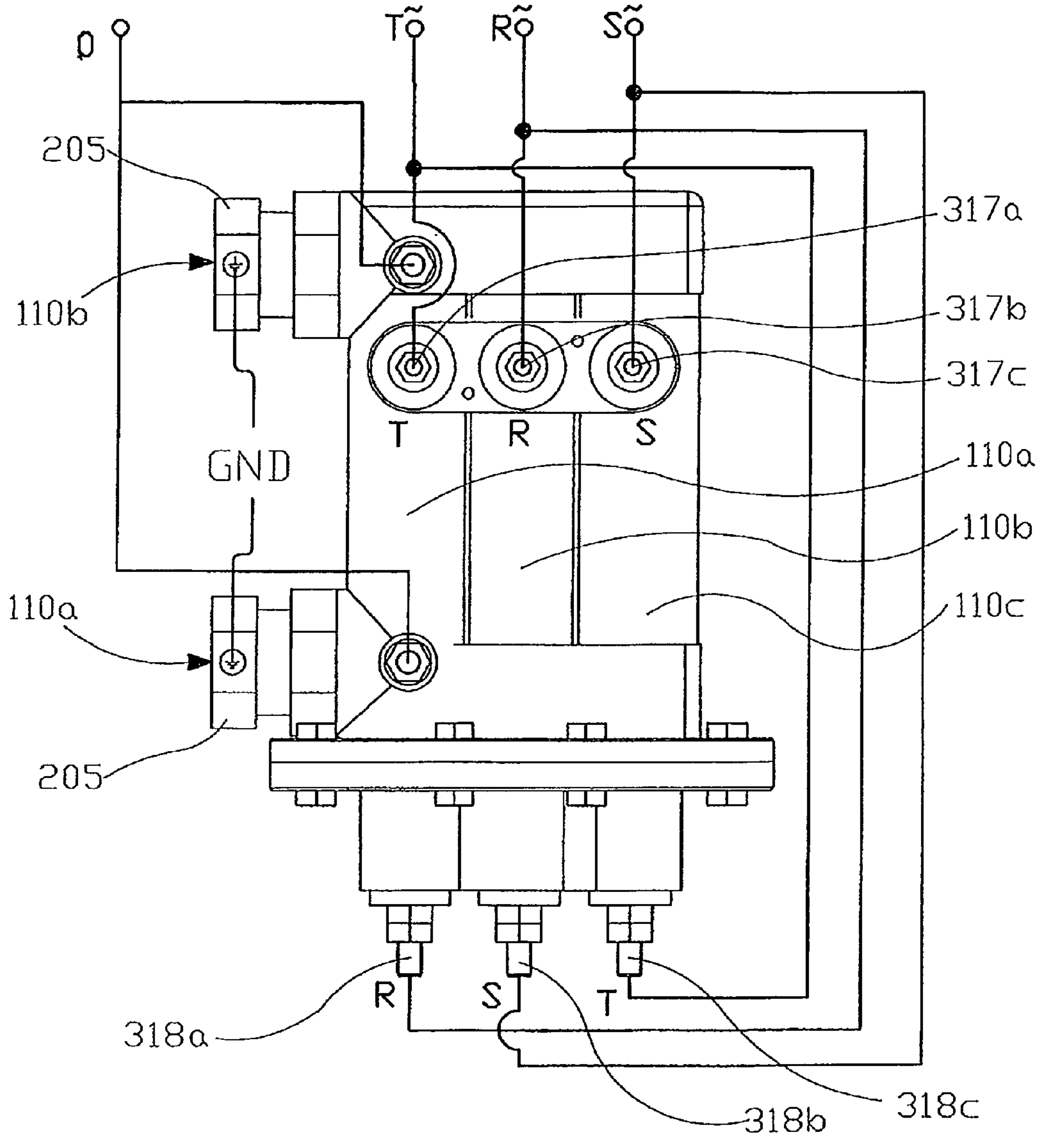

FIG. 3D shows a further embodiment for a different connection of the heating cells as described in FIGS. 3A, B. Again, three heating cells 110*a*, 110*b*, 110*c* are arranged in parallel along the heating flow between the fluid inlet 110*a* and the fluid outlet 110*b*. This embodiment differs from the embodiment as shown in FIG. 3C in that the circular electrodes 117*a*, 117*b*, 117*c* are now connected to different phases (instead of being connected to the neutral terminal O as in FIG. 3C). In detail, the first heating cell 110*a* has a cylindrical electrode 117*a* connected via the terminal 317*a* to the T-phase of the power supply, the middle heating cell 110*b* as the cylindrical electrode 117*b* connected via the terminal 317*b* to the R-phase, and the third heating cell 110*c* has a cylindrical electrode 117*c* connected via the terminal 317*c* to the S-phase of the power supply. The central electrodes 118*a*, 118*b*, 118*c* are connected via the terminal 318*a*, 318*b*, 318*c* in the same way to different phase as shown in FIG. 3C. By this connection also between the central electrodes 118 and the cylindrical electrodes 117 of each of the three heating cells 110*a*, 110*b*, 110*c* potentials of different phases are applied so that a current is flowing between the central electrode 118 and the cylindrical electrode 117 in each of these three parallel heating cells when a connection to the power supply is established.

Figure 4A:
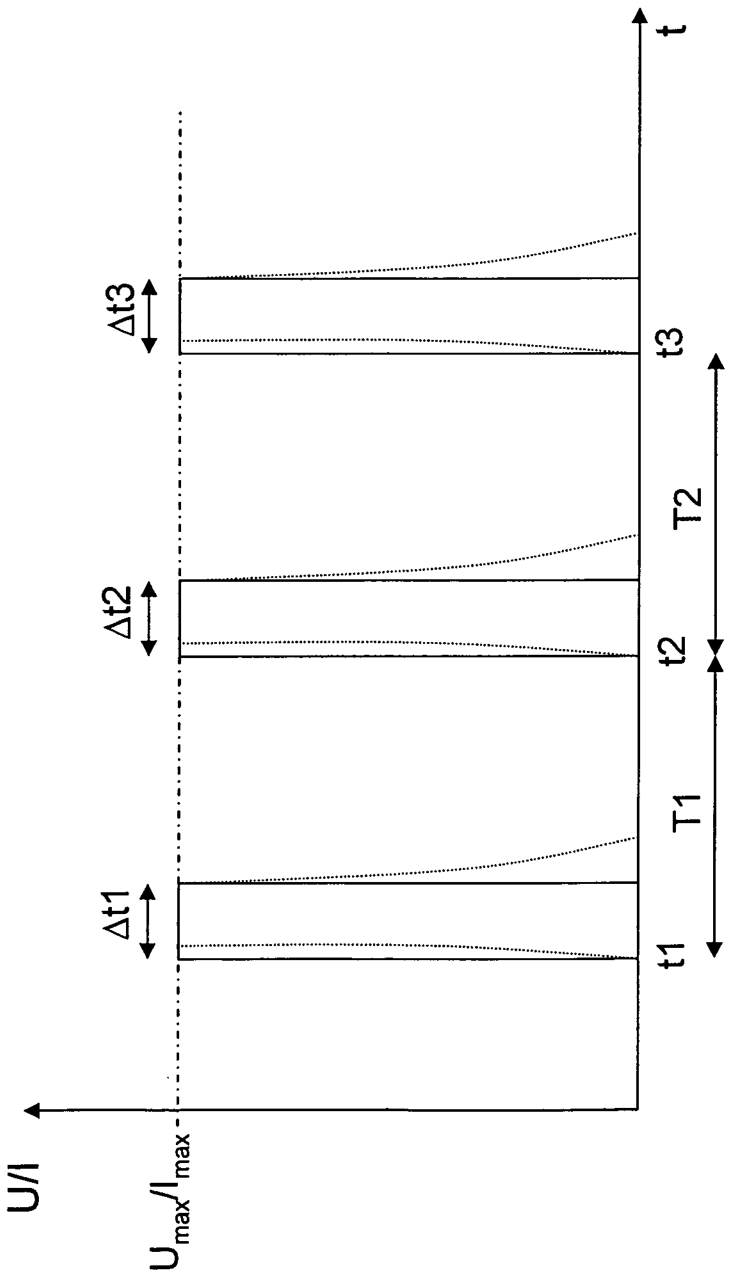
FIG. 4 depicts two graphs illustrating the controlling of the heating system.
Figure 4B:
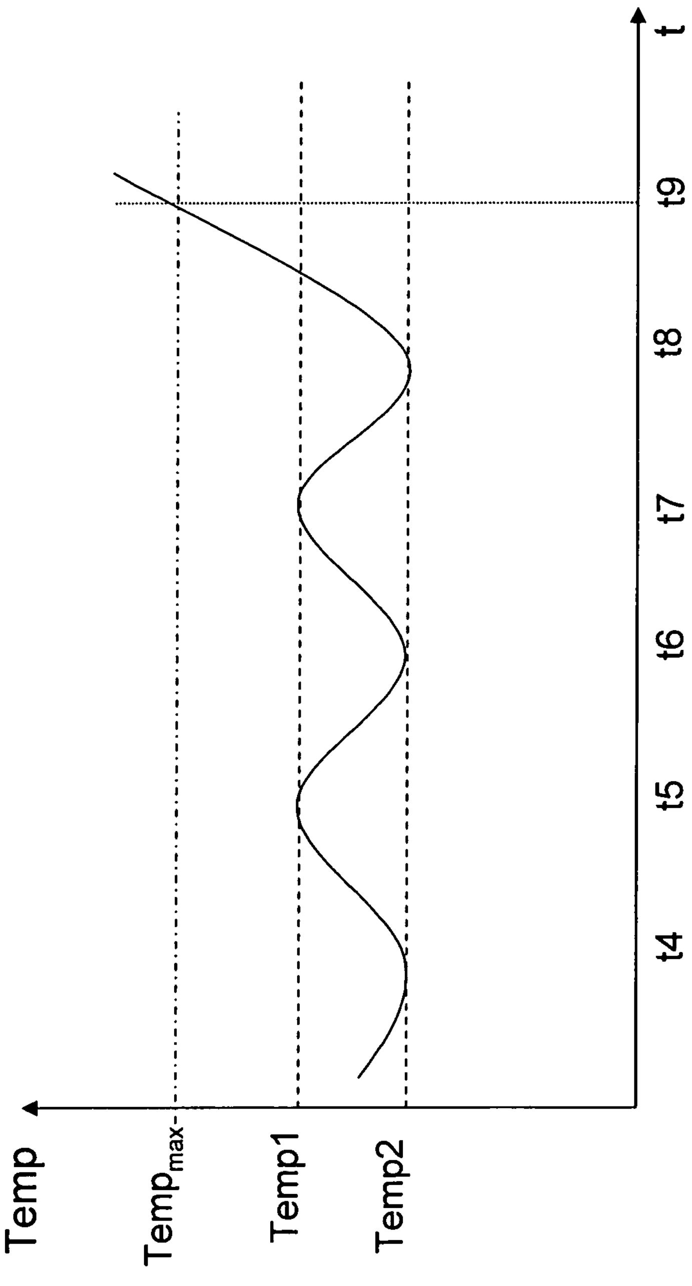

FIGS. 4*a* and 4*b* illustrate the pulsed operational mode for the electric heater. Because the electric heater 110 is operating by applying an electric current directly to the liquid, the conversion of the electric energy into heat of the primarily liquid is very efficient and the liquid is heated immediately if a current is applied to the primary liquid. This is the reason why the heating system 110 of the present invention can be operated in a pulse mode, wherein the electric current is not continuously applied to the primary heating liquid but as pulses with a certain pulse frequency.

In the embodiment shown in FIG. 4 a first pulse is generated at a time t1 for a time period Δt1, a second pulse is generated at the time t2 for a second time period Δt2 and the third pulse is generated at the time t3 for a third time period Δt3. The difference between the time t2 and t1 is given by a first delay T1. The difference between the time t3 and t2 is given by a second time delay T2. In further embodiments the time delays T1 and T2 can be selected equally or can differ (e.g. T1>T2). The pulse frequency is, e.g., defined as 1/T, wherein T=T1–T2.

Therefore, the voltage can be applied at the times t1, t2 and t3, wherein the voltage is applied over time periods Δt1 to Δt3. Between theses time periods the voltage is turned off until the next on-time (e.g. t2), where again for a time period Δt2 the voltage is applied to the electrodes. The electric current (see dashed line in FIG. 4*a*) will (almost) immediately rise when the voltage is applied and will fall rapidly after the voltage is turned off. Therefore, when the voltage is applied as pulses (as shown in FIG. 4*a*) the current will rapidly increase at the times t1, t2 and t3 until it also reaches a maximum value. After turning off the voltage (e.g. after the predetermined time Δt), the current will drop rapidly to a zero value.

As consequence, the primary liquid is not constantly subject to an electric current, but only during short periods of time the current is flowing through the liquid. The predetermined time period Δt can be adjusted in such a way that a gas generation by electrolyze in the primary liquid is suppressed. Moreover, the frequency of the pulses (or the times t1, t2, t3, . . . ) are controlled by the control panel 160 to adjust the operational temperature of the primary liquid accordingly. The time periods can also be adjusted differently so that, for example, the time period Δt1>Δt2>Δt3 or, alternatively, the time period Δt is at first smaller and increases with the time t.

FIG. 4*b* shows the temperature as function of time, wherein at an initial time t4 the temperature reaches a lower limit Temp2 indicating that the electric heater shall start to operate. At this time, the pulse mode is turned on a pulsed electric current as shown in FIG. 4*a* flows through the primary liquid so that the heater starts heating until the temperature of primary liquid reaches at time t5 an upper limit Temp1. At this time, the heater stops operating until the time t6, where the primary liquid again reaches the lower temperature threshold Temp2. At this time, the heater again starts to operate until the temperature reaches (or exceeds) the upper temperature Temp1, where the electric heater again ceases to apply current to the primary liquid. In case the temperature rapidly increases to exceed a maximal temperature $Temp_{max}$ at the time t9, where a safety thermostat sensor generates an emergency signal, the whole system is turned-off to prevent damages from the system.

As for the operation, different modes can be envisioned. For example, in case the temperature reaches the lower limit Temp2, a first pulse mode is initiated (e.g., with a pulse frequency of 17 or 10 or 20 Hz) and is maintained until the temperature of the primary liquid reaches the upper limit Temp1. At this time, the pulse mode is turned off, so that no current is applied to the primary liquid until the temperature of the primary liquid reaches the lower limit Temp 2. In a different operational mode, the frequency of the applied current or voltage to the primary liquid is modified such that when the temperature reaches the lower limit Temp2, the pulse frequency of the pulses is increased until the temperature reaches the upper temperature limit Temp1, where the pulse frequency of the applied electric current is again lowered, to thereby lower also the temperature until the primary liquid again reaches the lower temperature Temp2. In a different operational mode also the time duration Δt can be modified such that the pulse length (see FIG. 4*a*) of the voltage signal is modified to thereby apply more energy to the primary liquid and to increase the temperature of the liquid. For example, the pulse length Δt can be increased, when the primary liquid reaches the lower temperature Temp2 until the primary liquid again reaches the upper temperature Temp1, where the pulse length Δt of the applied voltage signals to the primary liquid can be decreased. In this latter operational mode, the pulse frequency of the pulsed signals can remain constant, whereas in the first operational mode the pulse length can remain constant, whereas the frequency of the applied pulse signals is modified.

The frequency of the pulsed signal (1/T) may, e.g., be modified in a range between 5 and 1000 Hz or between 10 Hz and 50 Hz or preferably be more than 17 Hz. The pulse length Δt may, e.g., selected to be more than 1 ms or more than 10 ms or between 50 ms and 100 ms.

Figure 5:
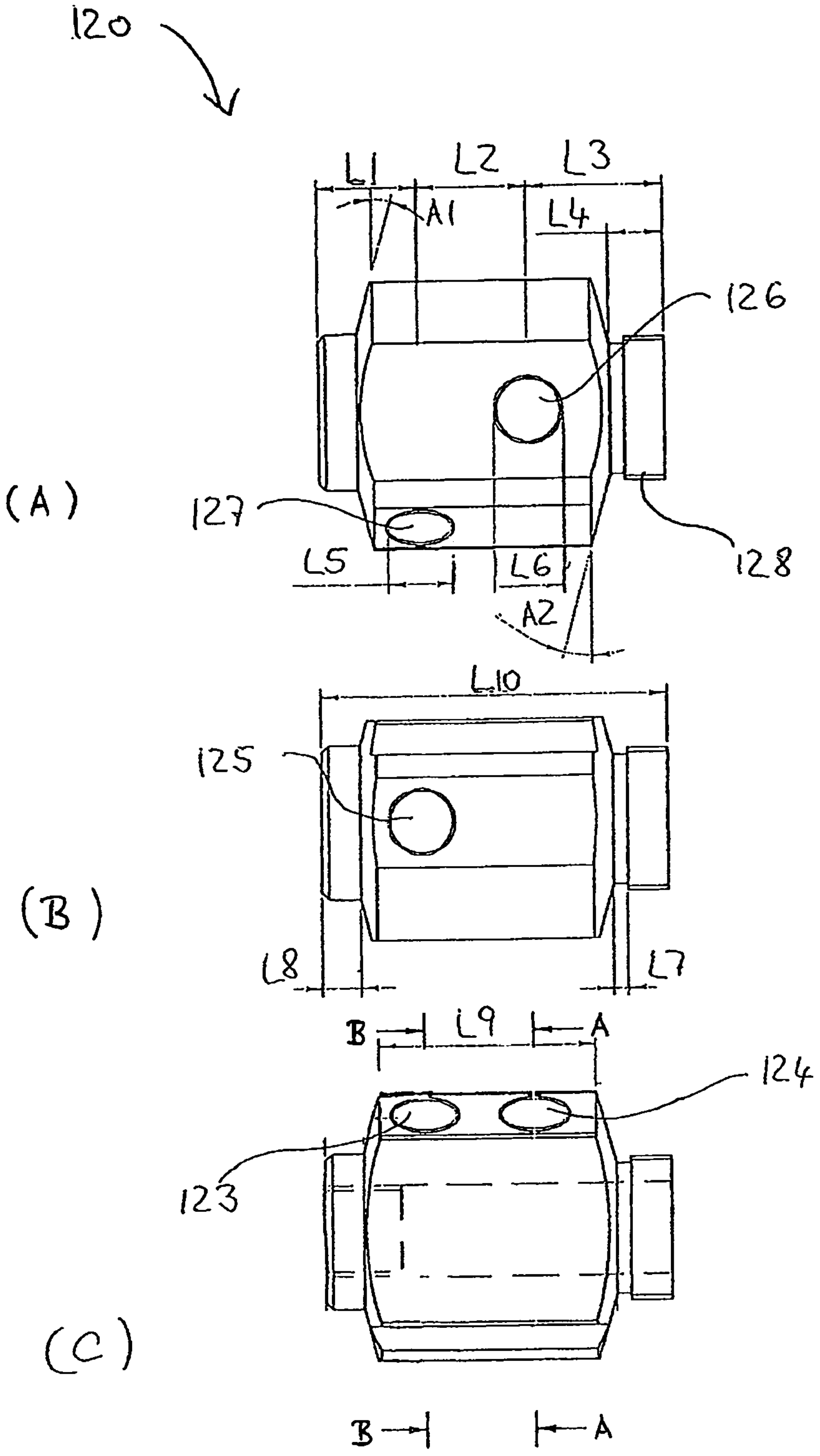
FIG. 5 depicts different sides of the control head according to embodiments.
Figure 6A:
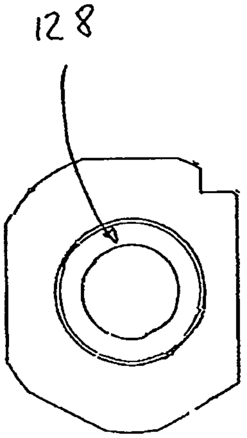
FIG. 6 depicts the liquid inlet and outlet of the control head according to embodiment.
Figure 6B:
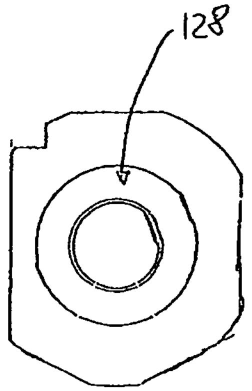

FIGS. 5 to 7 show embodiments for the control head 120 with various access ports 123, 124, 125, 126, 127, 128 to provide access to the primary heating liquid for different components. FIG. 5 shows views from the front, top and back side of the control head 120, FIG. 6 shows side views and FIG. 7 show two cross-sectional views of the control head 120.

FIG. 5A depicts the side, on which the access port 126 for the optional thermo-manometer 260 is formed (see FIG. 2). Below the opening 126 for the thermo-nanometer 260 the access port (opening) 127 for the connection to the expansion unit 270 is shown on the left hand side of the control head 120. FIG. 5B depicts the side, where the access port 125 for the air vent 250 is formed. Finally, FIG. 5C depicts the side, where the two openings 123, 124 for the working thermostat sensor 230 and for the safety thermostat sensor 240 are formed.

The dimensions are, e.g., as follows: the length L1 (distance of opening 127 from the left side): L1=29 mm (or between 15 . . . 40 mm), the length L2 (distance between openings 127 and 126): L2=32 mm (or between 25 . . . 40 mm), the length L3 (distance of opening 126 from the right side): L3=39 mm (or between 30 . . . 50 mm), the length L4 (width of a connecting portion 128 on the right hand side): L4=15.5 mm (or between 10 . . . 20 mm), the angle A1 (slope angle of left flange): A1=15° (or between 10 . . . 20°), the length L5 (diameter of opening 127): L5=13 mm (or ½ inch or between 10 . . . 20 mm), the length L6 (diameter of opening 126): L6=13 mm (or ½ inch or between 10 . . . 20 mm) and the angle A2 (slope angle of right flange): A2=15° (or between 10 . . . 20°), the length L7 (width of recess in portion 128): L7=4 mm (or between 2 . . . 6 mm) and the length L8 (width of a connecting portion 128 on the left hand side): L8=11 mm (or between 6 . . . 20 mm). The length L9 (distance between openings 123 and 124): L9=63.11 mm (or between 50 . . . 70 mm), the length L10 (overall length of control head 120): L0=100 mm (or between 50 . . . 150 mm).

FIG. 6A, B show side views of the control head 120, i.e. views perpendicular to the flow direction of the primary liquid when flowing from the electric heater 110 to the control head 120. The metal fittings 205 of the tubes 105 are connectable to portions 128 surrounding the flow path of the primary liquid.

Figure 7A:
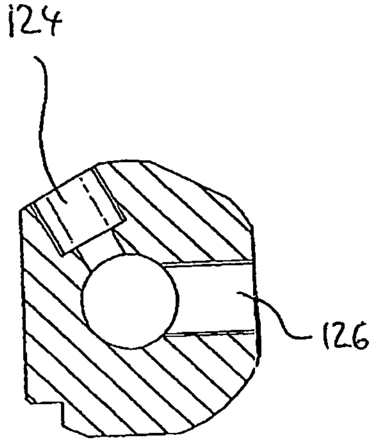
FIG. 7 depicts two cross sectional views of the control head.
Figure 7B:
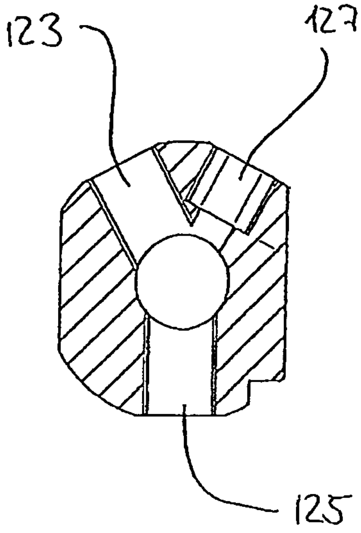

FIGS. 7A and 7B show cross-sectional views along the cross-sectional line A-A and B-B as shown in FIG. 5C. FIG. 7A shows the cross-sectional view along the cross-section A-A, wherein the opening 124 for the safety thermostat sensor 240 is shown together with the opening 126 for the thermo-manometer 260. FIG. 7B shows a cross-sectional view along the cross-section B-B, with the opening 125 for the air vent 250, the opening 123 for the thermostat sensor 230 and the opening 127 for the expansion unit 270.

Possible operational parameters of the heating system 100 may comprise the following values. The heating system 100 can be used to heat a space of up to 900 $m^3$ (or for spaces between 100-500 $m^3$). The volume of the primary liquid in the primary circle may, e.g., within the range of 1 to 5 L or, preferably, between 2.3-2.5 L. The voltage used for heating can be within the range of 90 V to 600 V (single phase or three phases or combination thereof at the same time; e.g. 220 V or 3×380 V). The frequency used for the pulsed mode may be modified from 0 to 1000 Hz or be more than 17 Hz (or between 10 . . . 40 Hz). The electric current supplied to the primary liquid may, e.g., be within the range of 1-25 A (or vary from 0 to 40 A). The applied power may be in the range between 1 and 24 kW (or 1 to 50 kW). The working pressure of the primary liquid within the system of tubes may be within the range of 1-2.2 bars (or between 1 and 4 bars). The maximum temperature $Temp_{max}$ limited by the safety thermostat may be up to 95° C. (or 10% below the boiling temperature of the primary liquid). The operational temperature can be varied continuously up to the maximal temperature, wherein a higher operating temperature of the primary circle may be set dependent on the used primary liquid.

The tubes 105 may comprise dielectric material and have a diameter of ¾ inch (or between 10 mm to 30 mm). The control head may comprise a cylindrical shape with a diameter of, e.g., 80.5 mm (or between 50 and 200 mm). The system of tubes 105 can be covered by a metal cladding or a metal shell, which improves the galvanic separation in that the whole system can be easily connected to the ground potential.

The primary liquid may contain ions or particular salts and can, in particular to be adapted to ensure that no sedimentation occurs during operation.

The embodiments described above an the accompanying drawing merely serve to illustrate the subject matter of the present invention and the beneficial effects associated therewith, and should not be understood to imply any limitation. The features of the invention, which are disclosed in the description, claims and drawings, may be relevant to the realization of the invention, both individually and in any combination.

The invention claimed is:

1. A heating system to heat a main heating circulation, said heating system comprising:

an electric heater adapted to heat a primary heating liquid by applying an electric current directly to said primary heating liquid;

a control head adapted to determine a temperature and a pressure of said primary heating liquid;

a heat exchanger with a first liquid passage for said primary heating liquid and a second liquid passage for a secondary heating liquid in said main heating circulation, said second liquid passage being in thermal contact with said first liquid passage to heat said secondary heating liquid while cooling said primary heating liquid;

a pump; and a plurality of tubes connecting said electric heater, said control head, said heat exchanger and said pump defining a circulation for said primary heating liquid, wherein said pump is adapted to pump said primary heating liquid such that heat is transferred from said heater via said heat exchanger into said main heating circulation, wherein said electric heater is connectable to a power supply comprising at least two power lines and said primary heating liquid flows through said electric heater along a flow path, said electric heater further comprising:

a central electrode connected to a central electrode terminal; and a cylindrical outer electrode connected to an outer electrode terminal, and wherein said central electrode and said cylindrical outer electrode are separated by said flow path in a coaxial arrangement such that an electric current flows between the central electrode and said cylindrical outer electrode when said at least two power lines are connected to said central electrode terminal and to said outer electrode terminal.

2. The heating system according to claim 1, wherein said heat exchanger is configured to provide a galvanic separation of said primary heating liquid from said secondary heating liquid.

3. The heating system according to claim 1, wherein said electric heater is connectable to a power supply comprising at least two power lines and provides a ground potential, said heating system further comprising metal fittings being arranged at ends of at least some of said plurality of tubes, and wherein said metal fittings are adapted to provide an electric connection between said primary heating liquid and said ground potential.

4. The heating system according to claim 1, wherein said power supply comprises a ground line (GND), said electric heater further comprising a ground electrode connectable to said ground line (GND) and provided perpendicular to said flow path, and wherein said ground electrode comprises passage ways for said primary liquid.

5. The heating system according to claim 1, wherein said control head further comprises an air vent which is configured to release air from the heating system.

6. The heating system according to claim 1, wherein said primary heating liquid is configured to provide a conductivity of 40-380 μS.

7. The heating system according to claim 1, wherein said secondary heating liquid comprises distilled water together with alcohol and/or glycol.

8. The heating system according to claim 1, wherein said power supply is an alternating current (AC) power supply and said heating system is configured to apply directly said alternative current (AC) to said central electrode and said cylindrical outer electrode to generate alternating current flowing through said primary heating liquid.

9. A heating system to heat a main heating circulation, said heating system comprising:

an electric heater adapted to heat a primary heating liquid by applying an electric current directly to said primary heating liquid;

a control head adapted to determine a temperature and a pressure of said primary heating liquid;

a heat exchanger with a first liquid passage for said primary heating liquid and a second liquid passage for a secondary heating liquid in said main heating circulation, said second liquid passage being in thermal contact with said first liquid passage to heat said secondary heating liquid while cooling said primary heating liquid;

a pump; and a plurality of tubes connecting said electric heater, said control head, said heat exchanger and said pump defining a circulation for said primary heating liquid, wherein said pump is adapted to pump said primary heating liquid such that heat is transferred from said heater via said heat exchanger into said main heating circulation, and wherein said control head comprises access ports providing contact to said primary heating liquid and being configured to couple to a working thermostat sensor connected to a working thermostat for providing said temperature of said primary heating liquid, to a safety thermostat sensor for providing a temperature threshold signal connected to the safety thermostat, to a pressure and temperature sensor for providing said pressure and temperature of said primary heating liquid, and an expansion unit for compensating a volume expansion of said primary heating liquid.

10. The heating system according to claim 9, further comprising a control unit configured to obtain said temperature and said pressure from said control head, and said control unit being further configured to modify said electric current applied to said primary heating liquid based on said temperature and pressure obtained from said control head.

11. The heating system according to claim 10, wherein said control unit is configured to cause said electric heater to apply a pulsed current with a pulse frequency to said primary heating liquid, and further to modify said pulse frequency of said pulsed current to heat said primary heating liquid on a target temperature (Temp1).

12. The heating system according to claim 10, wherein said control unit is configured to cause said electric heater to apply said electric current in pulses having a time period (Δt) to said primary heating liquid, and wherein said time period (Δt) is controlled such that said temperature of said primary heating liquid is in a working range.

13. The heating system according to claim 9, wherein said heat exchanger is configured to provide a galvanic separation of said primary heating liquid from said secondary heating liquid.

14. The heating system according to claim 9, wherein said electric heater is connectable to a power supply comprising at least two power lines and provides a ground potential, said heating system further comprising metal fittings being arranged at ends of at least some of said plurality of tubes, and wherein said metal fittings are adapted to provide an electric connection between said primary heating liquid and said ground potential.

15. The heating system according to claim 9, wherein said control head further comprises an air vent which is configured to release air from the heating system.

16. The heating system according to claim 9, wherein said primary heating liquid is configured to provide a conductivity of 40-380 μS.

17. The heating system according to claim 9, wherein said secondary heating liquid comprises distilled water together with alcohol and/or glycol.

18. A heating system to heat a main heating circulation, said heating system comprising:

an electric heater adapted to heat a primary heating liquid by applying an electric current directly to said primary heating liquid;

a control head adapted to determine a temperature and a pressure of said primary heating liquid;

a heat exchanger with a first liquid passage for said primary heating liquid and a second liquid passage for a secondary heating liquid in said main heating circulation, said second liquid passage being in thermal contact with said first liquid passage to heat said secondary heating liquid while cooling said primary heating liquid;

a pump; and a plurality of tubes connecting said electric heater, said control head, said heat exchanger and said pump defining a circulation for said primary heating liquid, wherein said pump is adapted to pump said primary heating liquid such that heat is transferred from said heater via said heat exchanger into said main heating circulation, and wherein said primary heating liquid comprises 30-80 vol.-% distilled water; 0.04-0.10 vol.-% Sodium tetraborate $Na_2B_4O_7 \times 10H_2O$; 20-65 vol.-% Propylene glycol $C_3H_8O_2$ or HO—$CH_2$—CHOH—$CH_3$; 0.002-0.025 vol.-% waterglass $Na_2SiO_3$; 0.01-0.15 vol.-% Ammonium molybdate $(NH_4)_2MoO_4$ and 1-3 vol.-% Acetic acid $CH_3COOH$.

19. A primary heating liquid for a heating system, said primary heating liquid comprising:

30-80 vol.-% distilled water; 0.04-0.10 vol.-% Sodium tetraborate $Na_2B_4O_7 \times 10H_2O$; 20-65 vol.-% Propylene glycol $C_3H_8O_2$ or HO—$CH_2$—CHOH—$CH_3$; 0.002-

0.025 vol.-% waterglass $Na_2SiO_3$; 0.01-0.15 vol.-% Ammonium molybdate $(NH_4)_2MoO_4$ and 1-3 vol.-% Acetic acid $CH_3COOH$.

20. A control head for a heating system, said heating system using a primary heating liquid and comprising a working thermostat sensor, a safety thermostat sensor, an air vent, a pressure and temperature sensor and an expansion unit, said control head comprising:

a plurality of access ports providing contact to said primary heating liquid and being configured to couple to said working thermostat sensor for providing said temperature of said primary heating liquid, to couple to said safety thermostat sensor to provide a temperature threshold signal, to couple to said pressure and temperature sensor for providing said pressure of said primary heating liquid, and to couple to said expansion unit for compensating a volume expansion of said primary heating liquid, to couple to said air vent, wherein said control head is integrally formed.

* * * * *